(12) United States Patent
Deng et al.

(10) Patent No.: US 11,713,642 B2
(45) Date of Patent: Aug. 1, 2023

(54) ELEMENT BACKUP

(71) Applicants: Guijun Deng, The Woodlands, TX (US); YingQing Xu, Tomball, TX (US); Alexander Morrison Kendall, Houston, TX (US); Keith J. Murphy, Hartford, CT (US)

(72) Inventors: Guijun Deng, The Woodlands, TX (US); YingQing Xu, Tomball, TX (US); Alexander Morrison Kendall, Houston, TX (US); Keith J. Murphy, Hartford, CT (US)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 430 days.

(21) Appl. No.: 15/991,429

(22) Filed: May 29, 2018

(65) Prior Publication Data

US 2019/0368304 A1     Dec. 5, 2019

(51) Int. Cl.
  *E21B 33/12*       (2006.01)
  *E21B 33/128*      (2006.01)
  *F16J 15/32*       (2016.01)

(52) U.S. Cl.
  CPC ........ *E21B 33/1216* (2013.01); *E21B 33/128* (2013.01); *E21B 2200/01* (2020.05); *F16J 15/32* (2013.01)

(58) Field of Classification Search
  CPC .............. E21B 33/1216; E21B 33/128; E21B 2033/005
  See application file for complete search history.

(56) References Cited

U.S. PATENT DOCUMENTS

| | | | | |
|---|---|---|---|---|
| 3,915,424 A | * | 10/1975 | LeRouax | F16J 15/26 251/1.2 |
| 5,176,217 A | * | 1/1993 | Luke | E21B 33/1216 166/195 |
| 9,273,526 B2 | | 3/2016 | Oberg et al. | |
| 9,784,066 B1 | * | 10/2017 | Branton | E21B 33/1216 |
| 9,995,541 B2 | * | 6/2018 | Wallmeroth | H01L 23/3735 |
| 11,473,391 B2 | * | 10/2022 | Jakkula | E21B 33/1208 |
| 2002/0043368 A1 | * | 4/2002 | Bell | E21B 33/1216 166/134 |

(Continued)

OTHER PUBLICATIONS

Notification of Transmittal of the International Search Report and the Written Opinion of the International Searching Authority, or the Declaration; PCT/US2019/028947; dated Sep. 11, 2019; ISR, 3 pages; WO 5 pages, total: 8 pages.

*Primary Examiner* — Christopher J Sebesta
*Assistant Examiner* — Neel Girish Patel
(74) *Attorney, Agent, or Firm* — Cantor Colburn LLP (57) ABSTRACT

An element backup including a first ring defining an axis; a first parting line through the first ring, the first parting line having a first plurality of generally axially extending segments and a first generally non-axially extending segment extending between the first plurality of axially extending segments; a second ring defining an axis; a second parting line through the second ring, the second parting line having a second plurality of generally axially extending segments and a second generally non-axially extending segment extending between the second plurality of axially extending segments; and an interconnection releasably securing the first and second rings to one another.

20 Claims, 6 Drawing Sheets

(56) References Cited

U.S. PATENT DOCUMENTS

| | | | |
|---|---|---|---|
| 2002/0070503 A1* | 6/2002 | Zimmerman | E21B 33/1216 277/337 |
| 2012/0025119 A1 | 2/2012 | Griffin et al. | |
| 2012/0217025 A1* | 8/2012 | Shkurti | E21B 33/1216 166/134 |
| 2013/0147121 A1* | 6/2013 | Xu | E21B 33/128 277/337 |
| 2013/0192853 A1* | 8/2013 | Themig | E21B 33/128 166/134 |
| 2013/0269929 A1* | 10/2013 | Smith | E21B 33/1216 166/118 |
| 2014/0190682 A1* | 7/2014 | Greenlee | E21B 33/13 166/118 |
| 2014/0262209 A1* | 9/2014 | Shek | E21B 33/10 166/116 |
| 2014/0332239 A1* | 11/2014 | Porta | E21B 33/128 166/387 |
| 2016/0067826 A1* | 3/2016 | Xu | B22F 3/11 219/76.12 |
| 2017/0350211 A1* | 12/2017 | Ingram | E21B 33/1216 |
| 2017/0370176 A1* | 12/2017 | Frazier | E21B 33/1291 |
| 2018/0023366 A1* | 1/2018 | Deng | E21B 33/1216 277/339 |
| 2018/0283139 A1* | 10/2018 | Cobb | F16J 15/3272 |
| 2018/0313184 A1* | 11/2018 | Merron | E21B 33/128 |
| 2021/0332661 A1* | 10/2021 | Tonti | E21B 23/01 |
| 2022/0081991 A1* | 3/2022 | Deng | E21B 33/128 |

\* cited by examiner

ELEMENT BACKUP

BACKGROUND

In the resource recovery industry seal elements are often used. In order to maintain the elements in the intended position, there are often backup rings or devices to help avoid extrusion of the seal element. There are many commercially accepted iterations of such but the art is always receptive to improvements that reduce element extrusion.

SUMMARY

An element backup including a first ring defining an axis; a first parting line through the first ring, the first parting line having a first plurality of generally axially extending segments and a first generally non-axially extending segment extending between the first plurality of axially extending segments; a second ring defining an axis; a second parting line through the second ring, the second parting line having a second plurality of generally axially extending segments and a second generally non-axially extending segment extending between the second plurality of axially extending segments; and an interconnection releasably securing the first and second rings to one another.

A borehole seal configuration including a mandrel; a seal element disposed about the mandrel; an element backup disposed adjacent the seal element, the element backup being defined as in any prior embodiment; a cone disposed adjacent the element backup opposite the seal element.

A method for making an element backup as in any prior embodiment, including depositing a layer of material on a substrate; fusing the layer of material; depositing subsequent layers of material and fusing each layer of material to the next until a completed element backup is formed.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
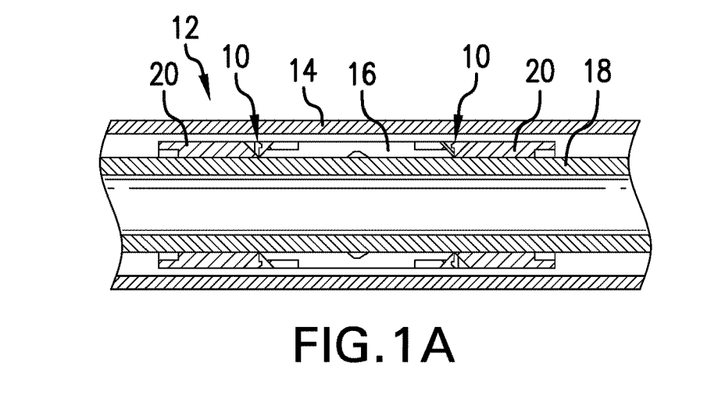
FIGS. 1A and 1B are sequential cross sectional views of before and after setting of a borehole tool.
Figure 1B:
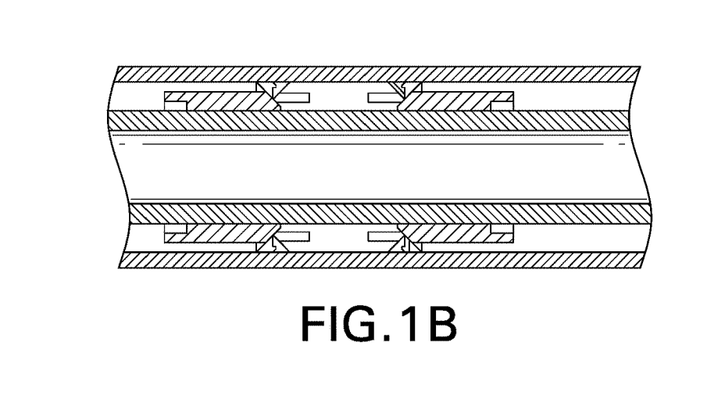

Referring to FIGS. 1A and 1B, an environment for the element backup 10 is illustrated. The environment is a borehole tool 12 such as a packer. The packer 12 is disposed within a tubular 14 such as a casing or open hole wall. There is an element 16 surrounding a mandrel 18 and setting force configurations 20 that move relatively toward one another during a setting process causing the element 16 to radially extend into contact with the tubular 14. The element backups 10 reduce or prevent extrusion of the element 16. In viewing FIGS. 1A and 1B simultaneously, one can see that the element backups 10 must grow radially to achieve their final position as shown in FIG. 1B. Facilitating this growth without creating extrusion pathways is desirable.

Figure 2:
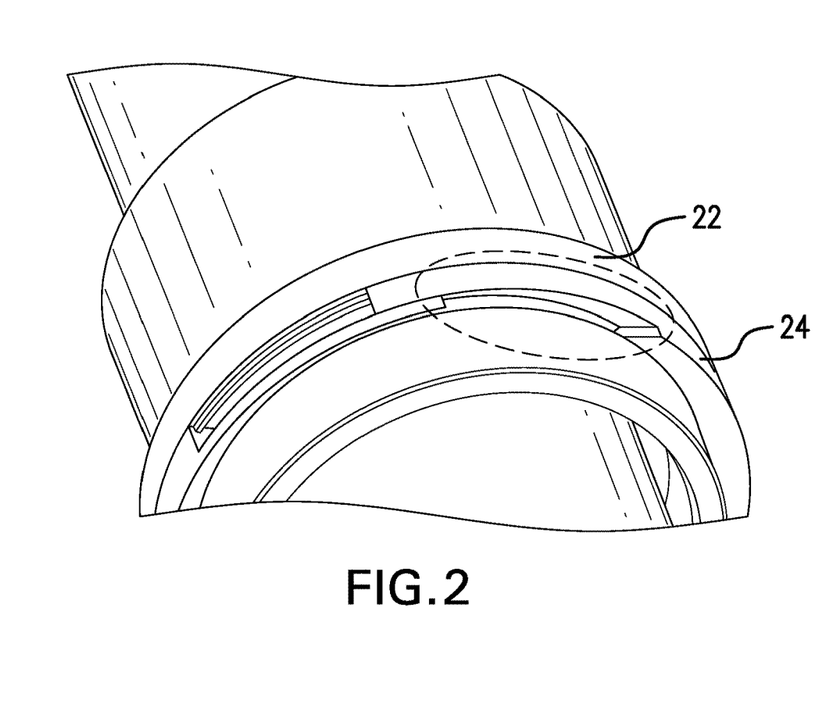
FIG. 2 is a perspective view of the tool of FIGS. 1A and 1B especially illustrating an element backup.
Figure 3:
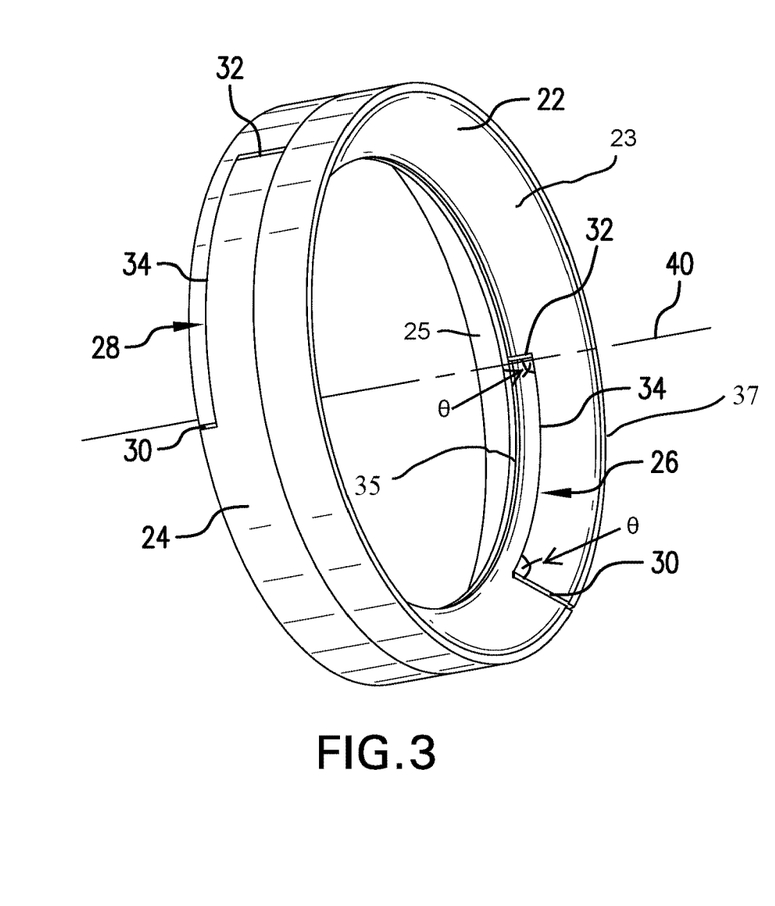
FIG. 3 is a perspective view of an element backup apart from other components of the borehole tool of FIG. 1A.

Referring to FIGS. 2 and 3 simultaneously, it will become clearer that the element backup 10 is configured as a first ring 22 (or cone ring), that in some embodiments includes a first frustoconical surface 23, and a second ring 24 (or packer ring), that in some embodiments includes a second frustoconical surface 25, where the first and second rings are adjacent one another. In embodiments, the frustoconical surfaces 23 and 25 come together at a point at a radially inward most extent of the first and second rings At least one of the rings, and in some embodiments both of the rings, includes a parting line 26 (and/or 28). For purposes of simplicity, the illustration of FIG. 3 includes only one parting line 26 for ring 22 and one parting line 28 for ring 24. It is to be appreciated that more than one parting line is contemplated for each ring and that in some embodiments the plurality of parting lines in a single ring may be evenly distributed around the ring. The number of parting lines contemplated is limited only by practicality of fitting them in a ring. In an embodiment 6 or 8 parting lines is contemplated that may be evenly distributed or not as desired. While not specifically shown, the visage of the parting lines 26, 28 shown in FIG. 3 will simply be multiplied about the rings.

Figure 4:
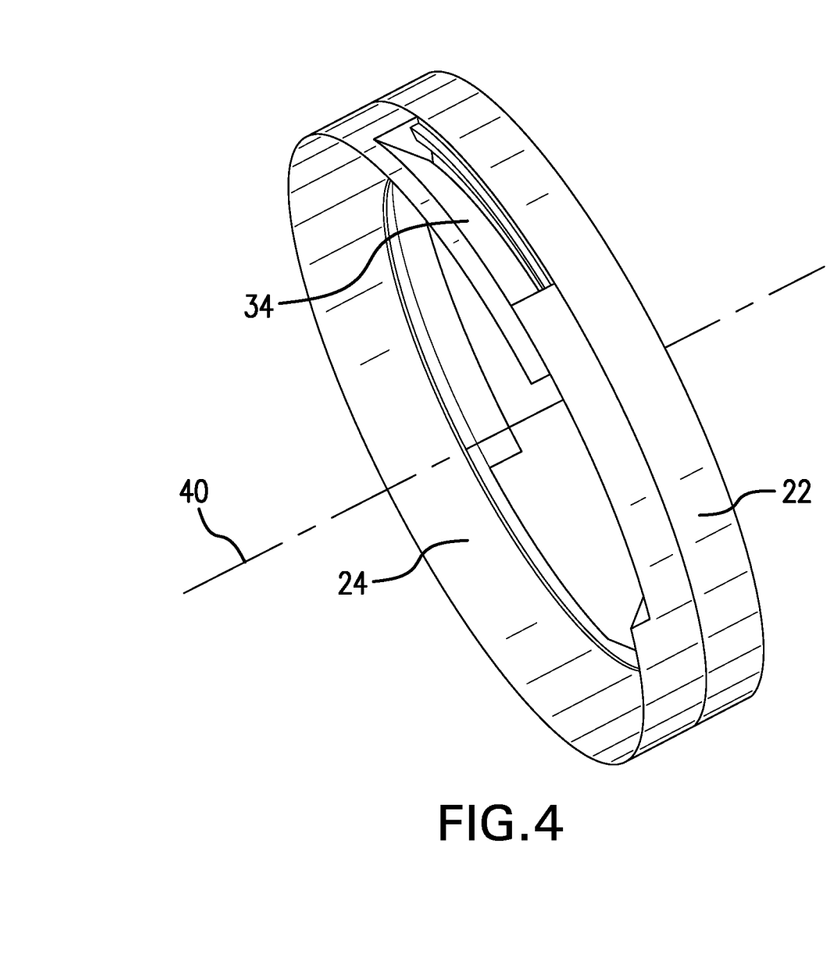
FIG. 4 is another perspective view of the element backup to bring out features thereof.
Figure 5:
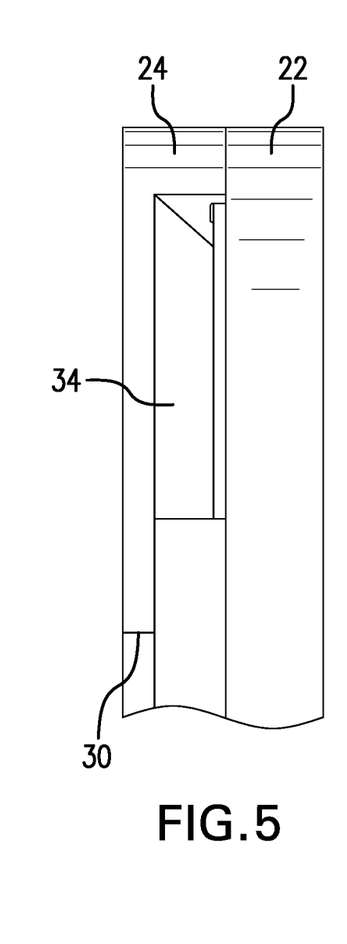
FIG. 5 is another perspective view of the element backup to bring out features thereof.

Parting lines 26, 28 include a plurality of segments wherein the plurality is at least a first and a second segment, the segments being disposed at an angle θ to one another as seen in FIG. 3. As is illustrated the angle θ is a nonzero angle meaning that the intersecting segments must intersect one another at something other than zero degrees of angle. In FIG. 3 this is about 90 degrees but more or fewer degrees are contemplated, other than zero. In an embodiment, the plurality of segments may be three segments as illustrated including generally axial extending segments 30 and 32 and a non-axially extending segment 34 extending between the generally axially extending segments 30 and 32. Segments 34 of each parting line 26 and 28 intersect the first ring surface 23 and second ring surface 25, respectively, between but not including an inside diameter 35 and an outside diameter 37 of the first ring surface 23 and the second ring surface 25. It is to be understood that the description above in this paragraph is applicable to a view of the subject ring and parting line from a distance of about a couple of feet to the side of the ring and looking generally radially toward the ring. It is to be appreciated that the parting line segments may each extend through a radial thickness of the rings along radii from an axis 40 defined through the rings 22 and 24. Alternatively, the segments 30, 32 and 34 may extend through the radial thickness of the rings 22 and 24 non-radially. In one embodiment, illustrated in FIGS. 4 and 5, the non-axially extending segment 34 is clearly illustrated to extend through the thickness of the ring 24 at an angle to the axis 40 that is not orthogonal thereto.

Figure 6:
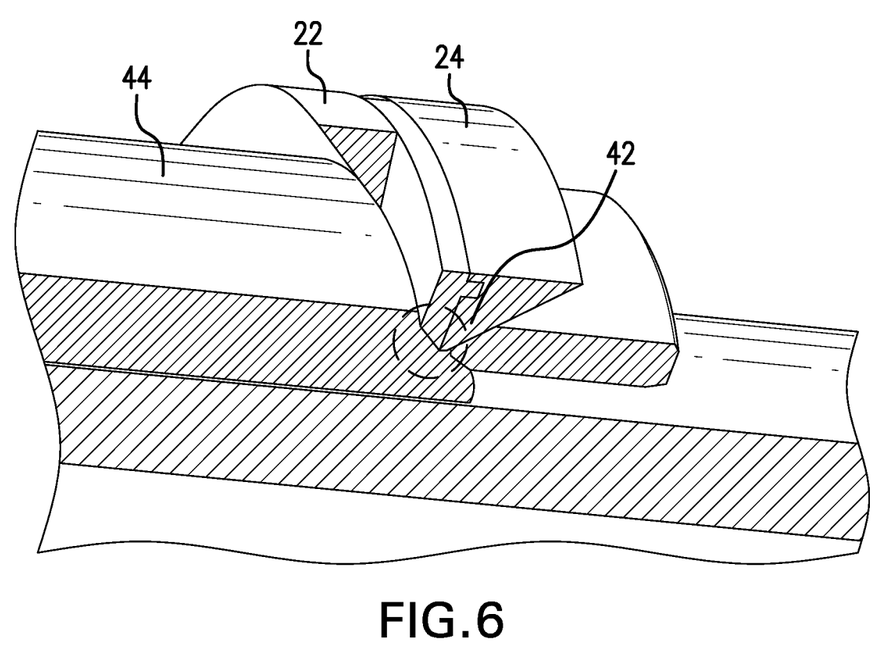
FIG. 6 is a cutaway perspective view of the backup on the tool to illustrate a feature.

The purpose of the segmented parting line is to allow for portions of the ring to remain annularly complete rather than leaving a large gap, which occurs if the parting line of a ring is a single axial segment. This improves extrusion resistance and can be seen in FIG. 2. Were it not for the segmented parting line more of the packer ring 24 would be unsupported thereby increasing extrusion risk. As shown in FIG. 6, the packer ring 24 is supported by a portion of ring 22 giving a greater contact area 42 with a cone 44. It is also noted in FIG. 6 that in some embodiments there is additionally a protrusion 46 from one or the other of the first and second rings and a complementary recess 48, in the other of the first and second rings to increase registration of the rings during expansion.

Figure 7:
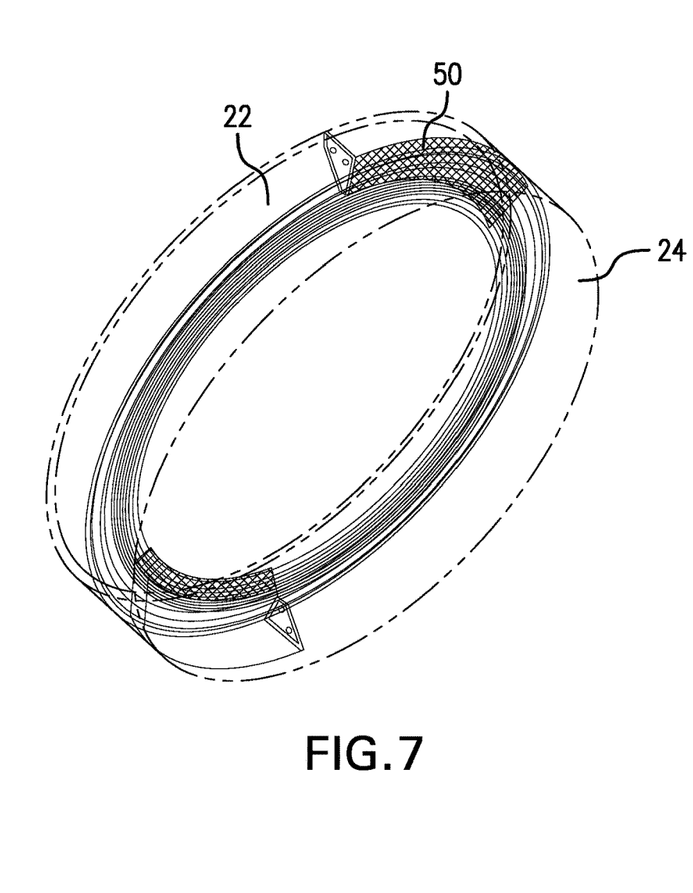
FIG. 7 is a perspective view of the element backup of FIG. 3 in phantom to illustrate an interconnection.
Figure 8:
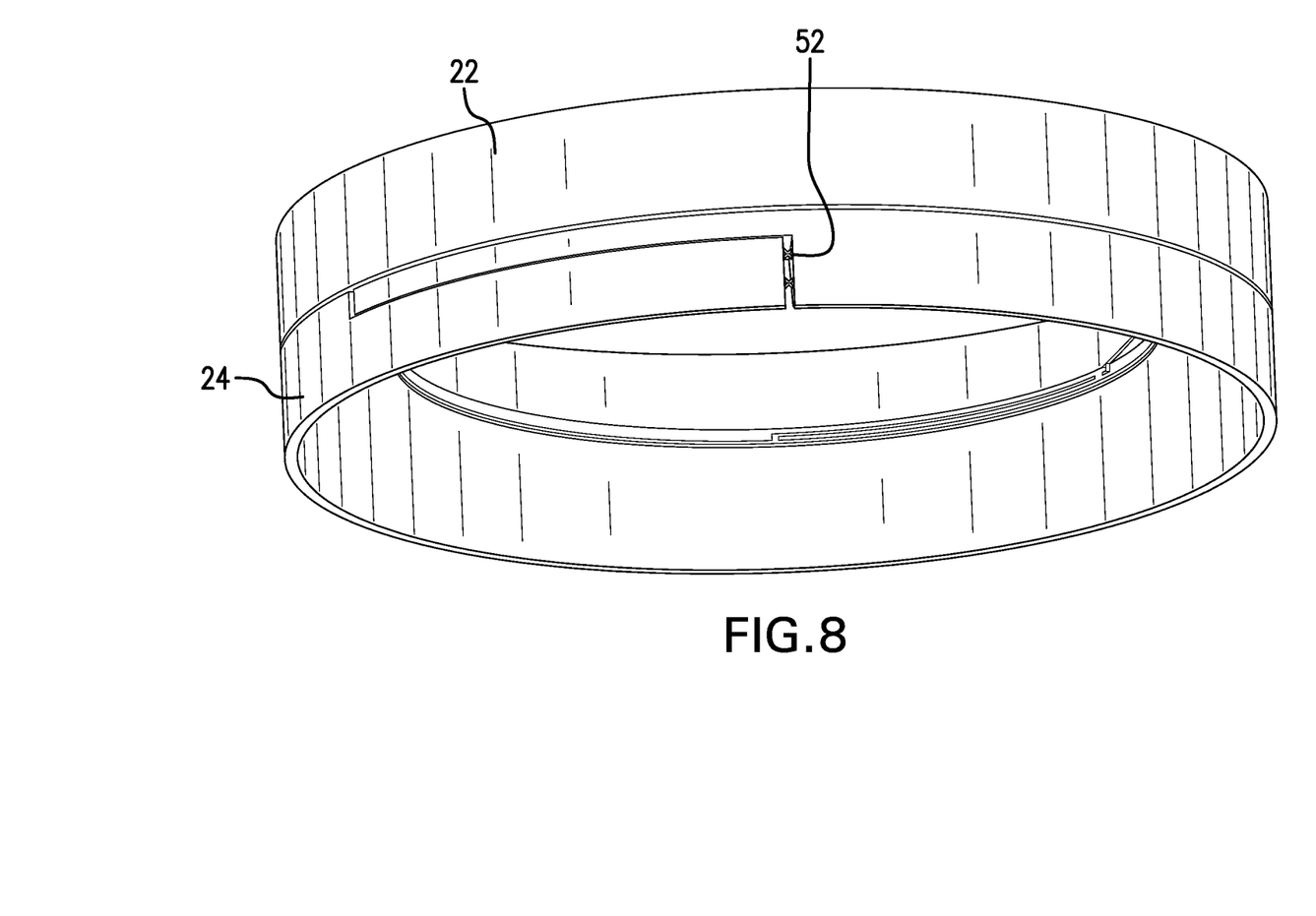
FIG. 8 is an enlarged view of the element backup illustrating a release member.

Referring to FIGS. 7 and 8, an interconnection 50 is illustrated connecting the rings 22 and 24 together for both ease of handling during manufacture and swab off resistance during running. The interconnection 50 is a mechanical connection between the two rings that is releasable by shearing, or other type of release. In one embodiment, the interconnection is created in an additive manufacturing operation that produces the element backup 10 in one piece. The interconnection 50 will be short sections of material bridging between the first ring 22 and the second ring 24. These may be in the shape of dashes or plus signs for example or the interconnection may be created merely by changing the density of the material between the two rings so that the material in that location will relatively easily fail under strain. It can be understood from FIG. 7 that the interconnection 50 is disposed orthogonally to the axis 40 of the rings 22 and 24. Similarly it is further noted that some embodiments (see FIG. 8) include a release member 52 disposed in the gap represented by segments 30 or 32. This is another unifying feature that like the foregoing assists in manufacturing, handling and swab off resistance during running.

Figure 9:
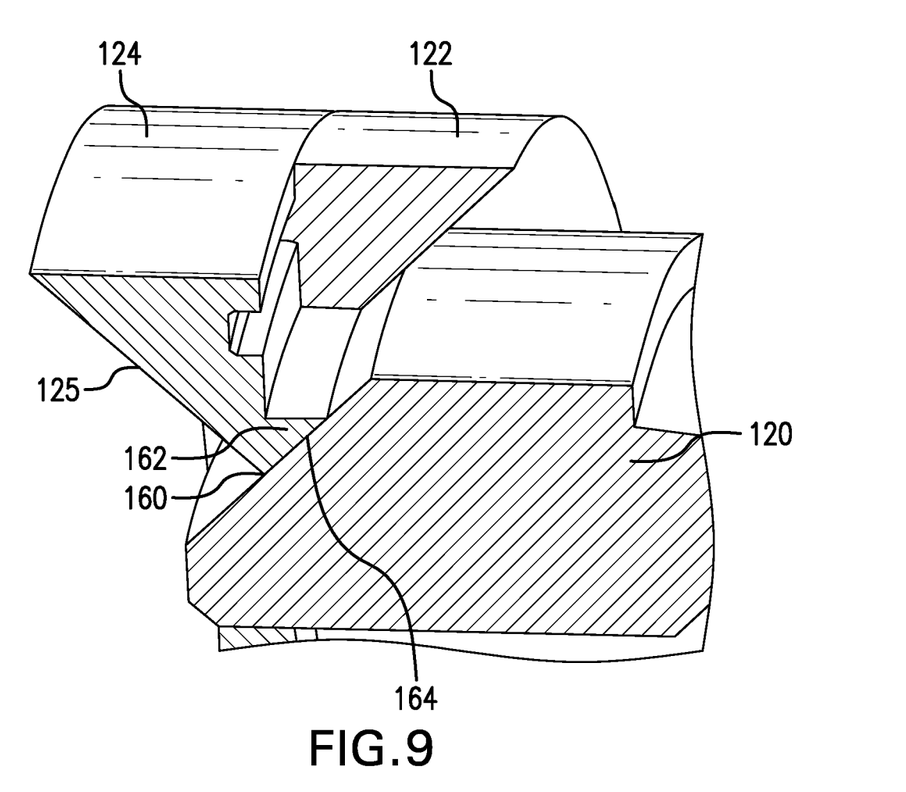
FIG. 9 is a perspective view of an alternate embodiment of an element backup.

Referring to FIG. 9, similar features to the foregoing will carry one hundred series numerals of the numerals used for the above described embodiments while features unique to the embodiment illustrated in FIG. 9 will bear one hundred series numerals larger than those numerals used in connection with the previously described embodiments. An element backup 110 is illustrated that creates a greater contact surface area and ring 124 thickness at an extrusion zone (intersection of the element backup 110 and a cone 120. In this embodiment, one of first and second rings 122, 124 has a modified shape as shown in the Figure to include an apex 160 and an overhang 162 extending from the apex 160, the apex 160 having a surface 164 extending at an angle from a frustoconical surface 125. The complementary ring 122 is likewise modified such that it will properly nest with the ring 124. In other respects the element backup 110 is similar to the foregoing.

Set forth below are some embodiments of the foregoing disclosure:

Embodiment 1

An element backup including a first ring defining an axis; a first parting line through the first ring, the first parting line having a first plurality of generally axially extending segments and a first generally non-axially extending segment extending between the first plurality of axially extending segments; a second ring defining an axis; a second parting line through the second ring, the second parting line having a second plurality of generally axially extending segments and a second generally non-axially extending segment extending between the second plurality of axially extending segments; and an interconnection releasably securing the first and second rings to one another.

Embodiment 2

The element backup as in any prior embodiment, wherein at least one of the first and second rings includes a frustoconical surface.

Embodiment 3

The element backup as in any prior embodiment, wherein the frustoconical surface includes an apex and an overhang extending from the apex, the apex having a surface extending at an angle from the frustoconical surface.

Embodiment 4

The element backup as in any prior embodiment, wherein the other of the first and second ring is complementarily nestable with the overhang.

Embodiment 5

The element backup as in any prior embodiment, wherein both of the first and second rings include frustoconical surfaces.

Embodiment 6

The element backup as in any prior embodiment, wherein the frustoconical surfaces of the first and second rings meet at a point at a radially inward most extent of the first and second rings.

Embodiment 7

The element backup as in any prior embodiment, wherein at least one of the first and second parting lines' non-axially extending segments is non-orthogonal to the axis.

Embodiment 8

The element backup as in any prior embodiment, wherein at least one of the first and second parting lines' non-axially extending segment is circumferentially disposed of the first and second rings.

Embodiment 9

The element backup as in any prior embodiment, wherein at least one of the first and second parting lines' non-axially extending segment is helically disposed of the first and second rings.

Embodiment 10

The element backup as in any prior embodiment, wherein at least one of the first and second parting lines' non-axially extending segment is non-orthogonal in a radial aspect thereof.

Embodiment 11

The element backup as in any prior embodiment, wherein the non-orthogonal radial aspect defines a surface that is parallel to a frustoconical surface of one of the first and second rings of which the non-axially extending segment is a part.

Embodiment 12

The element backup as in any prior embodiment, wherein at least one of the pluralities of generally axially extending segments of the first and the second parting lines is radially arranged.

Embodiment 13

The element backup as in any prior embodiment, wherein at least one of the pluralities of generally axially extending segments of the first and the second parting lines is non-radially arranged.

Embodiment 14

The element backup as in any prior embodiment, wherein at least one of the first and second parting lines is a plurality of first and second parting lines disposed about the corresponding first or second ring.

Embodiment 15

The element backup as in any prior embodiment, wherein the interconnection is shearable.

Embodiment 16

The element backup as in any prior embodiment, further including a release member at least one of the plurality of axial segments of the first and second parting lines.

Embodiment 17

The element backup as in any prior embodiment, wherein one of the first and second rings includes a recess and the other of the first and second rings includes a protrusion complementary to the recess.

Embodiment 18

A borehole seal configuration including a mandrel; a seal element disposed about the mandrel; an element backup disposed adjacent the seal element, the element backup being defined as in any prior embodiment; a cone disposed adjacent the element backup opposite the seal element.

Embodiment 19

A method for making an element backup as in any prior embodiment, including depositing a layer of material on a substrate; fusing the layer of material; depositing subsequent layers of material and fusing each layer of material to the next until a completed element backup is formed.

Embodiment 20

The method as in any prior embodiment, wherein the fusing is by applying laser radiation to each layer.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An element backup comprising:
a first ring defining an axis, a first inside diameter, a first outside diameter and a first ring surface extending radially from the first inside diameter to the first outside diameter;
a first parting line through the first ring, the first parting line having a first parting line first segment, a first parting line second segment, and a first parting line third segment extending between the first parting line first segment and the first parting line second segment and connecting at a non-zero angle with the first parting line first segment and at a non-zero angle with the first parting line second segment, the first parting line third segment intersecting the first ring surface between but not including the first inside diameter and first outside diameter;
a second ring defining an axis, a second inside diameter, a second outside diameter and a second ring surface extending radially from the second inside diameter to the second outside diameter;
a second parting line through the second ring, the second parting line having a second parting line first segment, a second parting line second segment, and a second parting line third segment extending between the second parting line first segment and the second parting line second segment and connecting the second parting line first segment and the second parting line second segment, the second parting line third segment intersecting the second ring surface between but not including the second inside diameter and second outside diameter; and an interconnection releasably securing the first and second rings to one another.

2. The element backup as claimed in claim 1 wherein at least one of the first and second ring surfaces includes a frustoconical surface.

3. The element backup as claimed in claim 2 wherein the frustoconical surface includes an apex and an overhang extending from the apex, the apex having a surface extending at an angle from the frustoconical surface.

4. The element backup as claimed in claim 3 wherein the other of the first and second ring is complementarily nestable with the overhang.

5. The element backup as claimed in claim 2 wherein both of the first and second ring surfaces include frustoconical surfaces.

6. The element backup as claimed in claim 5 wherein the frustoconical surfaces of the first and second rings meet at a point at a radially inward most extent of the first and second rings.

7. The element backup as claimed in claim 1 wherein at least one of the first parting line third segment and the second parting line third segment is non-orthogonal to the axis.

8. The element backup as claimed in claim 1 wherein at least one of the first parting line third segment and the second parting line third segment is circumferentially disposed of the first and second rings.

9. The element backup as claimed in claim 1 wherein at least one of the first parting line third segment and the second parting line third segment is helically disposed of the first and second rings.

10. The element backup as claimed in claim 1 wherein at least one of the first parting line third segment and second parting line third segment is non-orthogonal in a radial aspect thereof.

11. The element backup as claimed in claim 10 wherein the non-orthogonal radial aspect defines a surface that is parallel to a frustoconical surface of one of the first and second rings of which the third segment is a part.

12. The element backup as claimed in claim 1 wherein at least one of the first parting line first segment, the first parting line second segment, the second parting line first segment and the second parting line second segment is radially arranged.

13. The element backup as claimed in claim 1 wherein at least one of the first parting line first segment, the first parting line second segment, the second parting line first segment and the second parting line second segment is non-radially arranged.

14. The element backup as claimed in claim 1 wherein at least one of the first and second rings includes a plurality of first segments and a plurality of second segments.

15. The element backup as claimed in claim 1 wherein the interconnection is shearable.

16. The element backup as claimed in claim 1 further including a release member at at least one of the first parting line first segment, the first parting line second segment, the second parting line first segment and the second parting line second segment.

17. The element backup as claimed in claim 1 wherein one of the first and second rings includes a recess and the other of the first and second rings includes a protrusion complementary to the recess.

18. A borehole seal configuration comprising:
a mandrel;
a seal element disposed about the mandrel;
an element backup disposed adjacent the seal element, the element backup being defined in claim 1;
a cone disposed adjacent the element backup opposite the seal element.

19. A method for making an element backup as claimed in claim 1 comprising:
depositing a layer of material on a substrate;
fusing the layer of material;
depositing subsequent layers of material and fusing each layer of material to the next until a completed element backup is formed.

20. The method as claimed in claim 19 wherein the fusing is by applying laser radiation to each layer.

* * * * *